(12) United States Patent
Gisby et al.

(10) Patent No.: US 8,489,386 B2
(45) Date of Patent: Jul. 16, 2013

(54) METHOD AND SYSTEM FOR DIRECTING MEDIA STREAMS DURING A CONFERENCE CALL

(75) Inventors: Douglas Gisby, Atlanta, GA (US); Brian Oliver, Fergus (CA); Christopher Labrador, Waterloo (CA); Andrew Allen, Mundelein, IL (US); Ian McDonald, Waterloo (CA); Michael Langlois, Almonte (CA)

(73) Assignee: Research In Motion Limited, Waterloo, Ontario (CA)

( * ) Notice: Subject to any disclaimer, the term of this patent is extended or adjusted under 35 U.S.C. 154(b) by 920 days.

(21) Appl. No.: 12/394,440

(22) Filed: Feb. 27, 2009

(65) Prior Publication Data

US 2010/0223044 A1     Sep. 2, 2010

(51) Int. Cl.
  *G06F 17/28* (2006.01)
(52) U.S. Cl.
  USPC ............... 704/3; 715/753; 704/270; 370/352
(58) Field of Classification Search
  USPC ............... 704/3; 370/260; 379/68; 715/753
  See application file for complete search history.

(56) References Cited

U.S. PATENT DOCUMENTS

| | | | | |
|---|---|---|---|---|
| 6,816,468 | B1* | 11/2004 | Cruickshank | 370/260 |
| 2001/0051535 | A1* | 12/2001 | Kamimura et al. | 455/566 |
| 2005/0034079 | A1* | 2/2005 | Gunasekar et al. | 715/753 |
| 2007/0110043 | A1* | 5/2007 | Girard | 370/352 |
| 2008/0300852 | A1 | 12/2008 | Johnson et al. | |
| 2009/0006076 | A1* | 1/2009 | Jindal | 704/3 |
| 2009/0125295 | A1* | 5/2009 | Drewes | 704/3 |
| 2010/0150331 | A1* | 6/2010 | Gitelis et al. | 379/202.01 |
| 2010/0158203 | A1* | 6/2010 | Mikan et al. | 379/68 |

OTHER PUBLICATIONS

International Search Report mailed May 27, 2010, for International Application No. PCT/CA2010/000224.
Evan et al., "Conferencing Scenarios", Network Working Group Request for Comments: 4597, (Jul. 2006) pp. 1-18.
German Patent and Trademark Office (GPTO), Office Action dated Dec. 18, 2012 for German Patent Application No. 112010000925.2, 7 pages.
Canadian Intellectual Property Office, Office Action dated May 9, 2012 for Canadian Patent Application No. 2,722,761, 2 pages.
Extended European Search Report mailed Apr. 24, 2013, for European Application No. 10745759.0 (6 pages).

* cited by examiner

*Primary Examiner* — Qi Han
*Assistant Examiner* — Mark Villena
(74) *Attorney, Agent, or Firm* — Finnegan, Henderson, Farabow, Garrett & Dunner, LLP (57) ABSTRACT

A system for directing media streams during a conference call, including an enterprise, at least one network provided within the enterprise and in communication with a plurality of communication devices, a platform provided within the enterprise and in communication with the network, the platform comprising a protocol layer, a services layer and an application layer, and a conference call server in communication with the platform, wherein the platform is configured for receiving media streams from each of the communication devices and instructing the conference call server on how to direct the media streams to and from each of the communication devices.

18 Claims, 11 Drawing Sheets

METHOD AND SYSTEM FOR DIRECTING MEDIA STREAMS DURING A CONFERENCE CALL

FIELD OF THE DISCLOSURE

The present disclosure relates to conference calling, and more specifically to a method and system for directing media streams during a conference call.

BACKGROUND

Conference calls are well known in today's expanding marketplace as a mechanism for business employees and clients to communicate with each other, regardless of their location. In some cases, due to the globalization of businesses and their customers, such conference calls take place among participants located in several different countries.

Although conventional conference call systems enable these participants to communicate with each other in a single call, efficient communication can become an issue when dealing with participants who are not fluent in or do not speak the language in which the call is conducted. To address this problem, translation services have been developed that enable a participant to receive media data of the conference call in their primary language. To utilize such services, the participant typically either subscribes to the service or downloads the necessary software. As the conference call proceeds, the media stream is sent to the endpoint associated with the participant, where it is translated and transmitted to the participant's communication device. Similarly, when the participant responds to the incoming media stream in his desired language, it is translated into the primary language of the call and transmitted to the endpoints associated with the other participants.

Because each participant in a conference call is generally associated with a single endpoint, a translation service is typically required at each endpoint to independently translate the media streams between the primary language and the desired languages of those participants who do not understand the primary language, and direct the media streams between the various endpoints. Such a system is inefficient, time consuming and impractical, especially when the conference call includes dozens or more participants, each located in different areas of the world.

Accordingly, there is a need for a system that efficiently enables translation and direction of media streams during a conference call.

DETAILED DESCRIPTION

The present disclosure provides a method and system for directing communication streams. A multi-layer platform is provided in the architecture of an enterprise system, and is in communication with, among other things, a plurality of servers each configured for executing a corresponding application. The platform is configured for receiving and directing communications between application servers and a plurality of mobile devices.

More specifically, a system for directing media streams during a conference call, including an enterprise, at least one network provided within the enterprise and in communication with a plurality of communication devices, a platform provided within the enterprise and in communication with the network, the platform comprising a protocol layer, a services layer and an application layer, and a conference call server in communication with the platform, wherein the platform is configured for receiving media streams from each of the communication devices and instructing the conference call server on how to direct the media streams to and from each of the communication devices.

A method for directing media streams through a system during a conference call is also provided. The system includes an enterprise, at least one network provided within the enterprise and in communication with at least one communication device, a platform provided within the enterprise and in communication with the network, the platform comprising a protocol layer, a services layer and an application layer, a private branch exchange server and a conference call server, both in communication with the platform. The method includes connecting the communication device to the conference call server, selecting a device language from a menu on the communication device for conducting the conference call, the menu including a plurality of languages, the device language being different from a conference call language, directing a media stream from the conference call server to a translation server, translating the media stream at the translation server from the conference call language into the device language, sending the translated media stream to the private branch exchange server, and directing the translated media stream from the private branch exchange server to the communication device.

A method of providing translations in a system during a conference call, the system including a conference call server, a communication device, a translation server, and a session management platform for establishing and directing media streams, the conference call having a call language. The method including, receiving, at the session management platform, a language selection from the communication device, wherein the selected language differs from the call language; routing media from the device to the conference server through the translation server; routing media from the conference server to the device through the translation server; and, at the translation server, translating media from the device into the call language before transmitting it to the conference server, and translating media from the conference server into the selected language before transmitting it to the device.

A system for managing a conference call including a communication device, the conference call having a call language. The system includes a conference call server for managing media for the conference call; a session management platform configured to receive a language selection from the communication device, wherein the selected language differs from the call language; and a translation server. The session management platform is configured to send instructions in response to the received language selection to cause media to be routed from the device to the conference server through the translation server and to cause media to be routed from the conference server to the device through the translation server. The translation server is configured to translate media from the device into the call language before transmitting it to the conference server, and to translate media from the conference server into the selected language before transmitting it to the device.

In addition, a conference call server for a communication system is also provided. The communication system includes an enterprise, at least one network provided within the enterprise and in communication with at least one communication device, a platform provided within the enterprise and in communication with the network, the platform comprising a protocol layer, a services layer and an application layer, a private branch exchange server and a conference call server, both in communication with the platform. The conference call server includes a translation server configured for translating each of a plurality of media streams received by the conference call server into a selected language, wherein the conference call server is configured for receiving the media streams from a plurality of communication devices and directing the translated media streams to each communication device.

Figure 1:
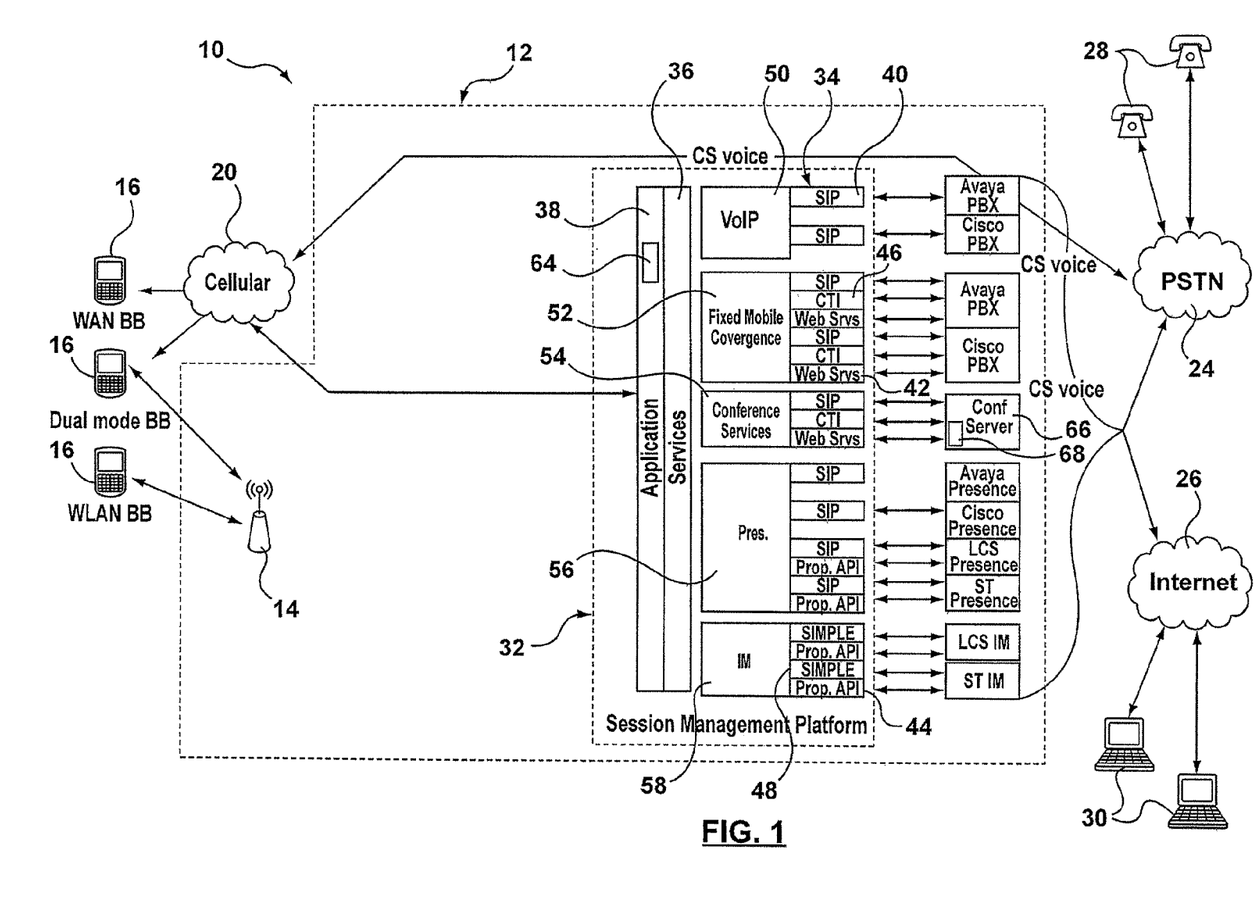
FIG. 1 is a schematic diagram showing an enterprise network in accordance with the present disclosure.

Referring now to FIG. 1, a system for directing media streams is provided and generally designated 10. The system 10 includes an enterprise or business system 12 that contains a wireless network 14 in communication with at least one mobile device 16, such as a WLAN or dual mode communication device configured for communicating with the wireless network, as known in the art. The cellular network 20 is located outside of the enterprise 12 and is also in communication with at least one of the mobile devices 16, such as a WAN or dual mode communication device, as known in the art.

A Public Switched Telephony Network or PSTN 24 and an Internet network 26 are in communication with the enterprise 12, and more specifically are in communication with corresponding servers provided in the enterprise, as known in the art. The PSTN 24 is also in communication with at least one telephone 28 and the Internet network 26 is in communication with at least one computer 30. However, it will be appreciated that the system 10 is not limited to the networks or devices described herein.

A platform (herein referred to as a Service Management Platform or SMP) 32 is provided within the enterprise 12 and is configured for enabling execution of a plurality of applications through the use of one of a plurality of protocols. The SMP 32 is configured to communicate with both the cellular network 20 and the wireless network 14 and, for security purposes, is preferably located behind a corporate firewall (not shown). More specifically, the SMP 32, among other things, takes in signaling from the mobile device 16, and instructs corresponding servers in the enterprise 12 how to direct the signaling to and from the mobile device, which will be described in further detail below. It is to be understood that the SMP 32 can either be a stand-alone server (as shown in FIG. 1 and as described in the present application), or it can be implemented into an existing control agent/server as a logical software component that enables the control agent to remotely control other servers (not shown).

Referring still to FIG. 1, the SMP 32 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication device and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 40, a Web Services protocol 42, an Application Programming Interface or API 44, a Computer Telephony Integration protocol or CTI 46, and a Session Initiation Protocol for Instant Messaging and Presence Leveraging Extensions or SIMPLE protocol 48. It is contemplated that the interface protocols 40-48 are plug-ins that can interface directly with corresponding servers in the enterprise 12, which will be further described below.

For the purposes of this disclosure, SIP 40 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. Media streams during a session are sent over a media protocol such as RTP (Real Time Protocol), and are controlled by SIP. As further known by those of ordinary skill in the art, the SIP protocol 40 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). Throughout this application, it is to be understood that either SIP-L or SIP-T can be utilized to control the media streams. Specific operation of the system 10 utilizing SIP 40 will be described in further detail below.

The SMP 32 also includes a plurality of enablers, among other things, a VoIP enabler 50, a Fixed Mobile Convergence or FMC enabler 52, a conference services enabler 54, a presence enabler 56 and an Instant Messaging or IM enabler 58. Each of the enablers 50-58 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

Figure 2A:
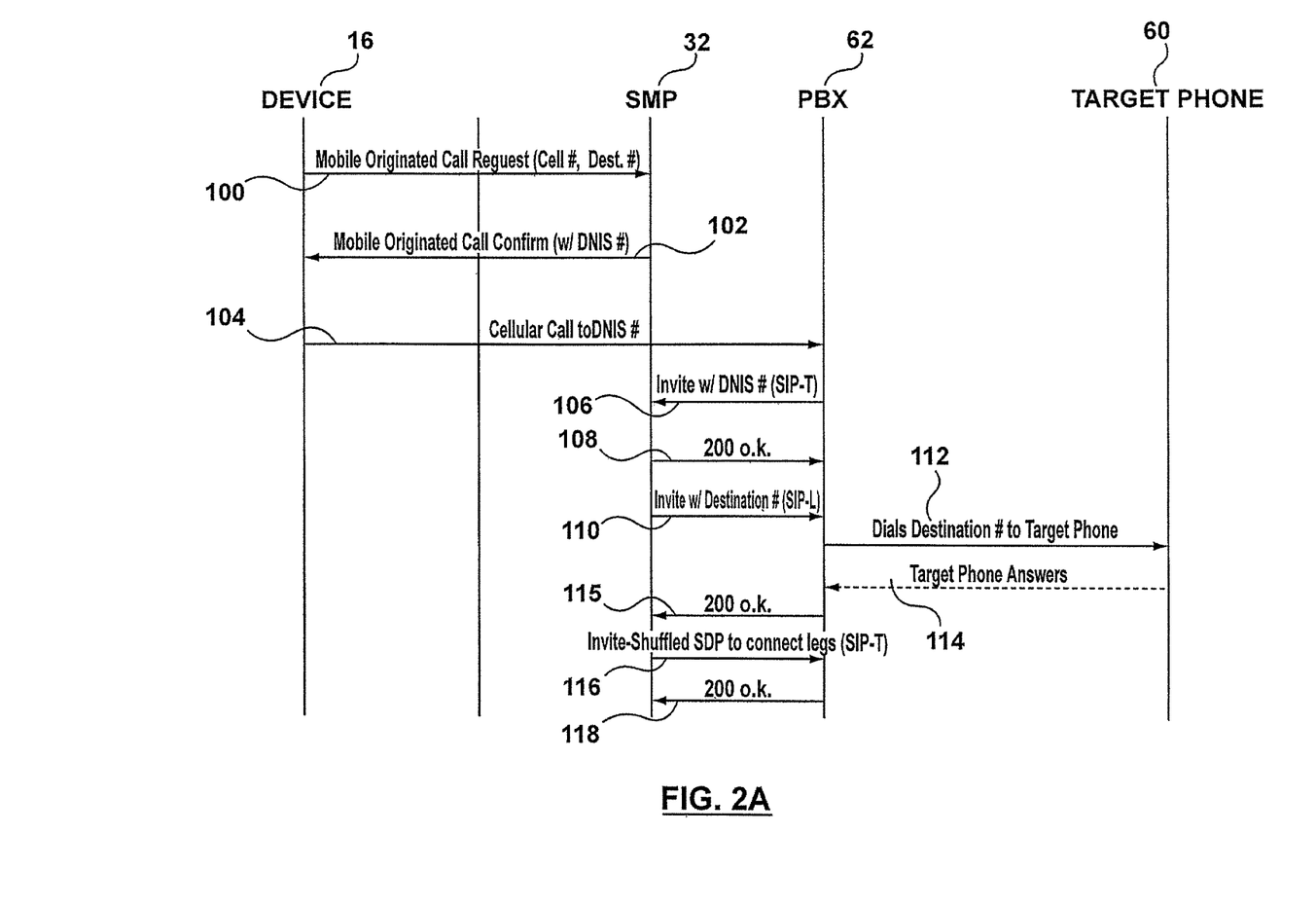
FIG. 2A is a signaling diagram generally indicating how mobile-originated, mobile-initiated calls are processed by the network of FIG. 1.

Turning now to FIGS. 2A-3B, the general operation of the system 10 using SIP 40 as the control protocol will be discussed, although it is recognized that the present system is not limited to the processes discussed herein. FIG. 2a provides a signaling diagram for a call originating from one of the mobile devices 16 to a target phone 60 connected to a Private Branch Exchange Server or PBX 62 provided within the enterprise 12. First, the device 16 sends a mobile originated call request with its cellular number and the destination number of the target phone 60 through the enterprise server 28 to the SMP 32 (block 100). The SMP 32 confirms the call request by sending the DNIS number to the device (block 102). Next, the device 16 makes a cellular call using the DNIS number, which is received by the PBX 62 (block 104). As the DNIS has been configured in the PBX 62 to be routed to the SMP 32, in response to the incoming call, the PBX 62 sends an invite with the DNIS number to the SMP 32 (block 106). The SMP 32 matches the incoming call with the expected call from the mobile, and if correct, acknowledges the invite by sending a 200 o.k. signal to the PBX, indicating that the mobile call leg is established (block 108).

The SMP 32 then sets up the outgoing call leg to the destination. It does this by sending an invite to the PBX 62 with the destination number of the target phone (block 110). SIP-L is preferably used as the control protocol, so that the call can be correctly attributed to the individual within the organization within any call records that are being maintained by the PBX 62. When the invite is received, the PBX 62 dials the destination number to the target phone 60 (block 112), and the target phone answers the call (block 114). When the target phone is answered, the PBX sends a 200 o.k. signal to the SMP 32 indicating that the target phone is ready to receive data (block 115). The SMP 32 then sends an invite to the PBX 62 and shuffles the SDP (Session Description Protocol, as known to those of ordinary skill in the art) to connect the call legs (block 116). When the call legs are connected, the PBX 62 sends a second 200 o.k. signal to the SMP 32 (block 118), and the users of the device 16 and target phone 60 can communicate with each other.

Note that between the cellular call leg being established and the outgoing call leg being answered, the mobile user hears ringing tones. These ringing tones may be provided by the PBX 62 using the presentation of early media from the outgoing call leg, or they may be generated locally on the device if early media is not available. In the latter case, it will be necessary to localize the ringing tone to match the tone normally heard with a call through the PBX 62.

Figure 2B:
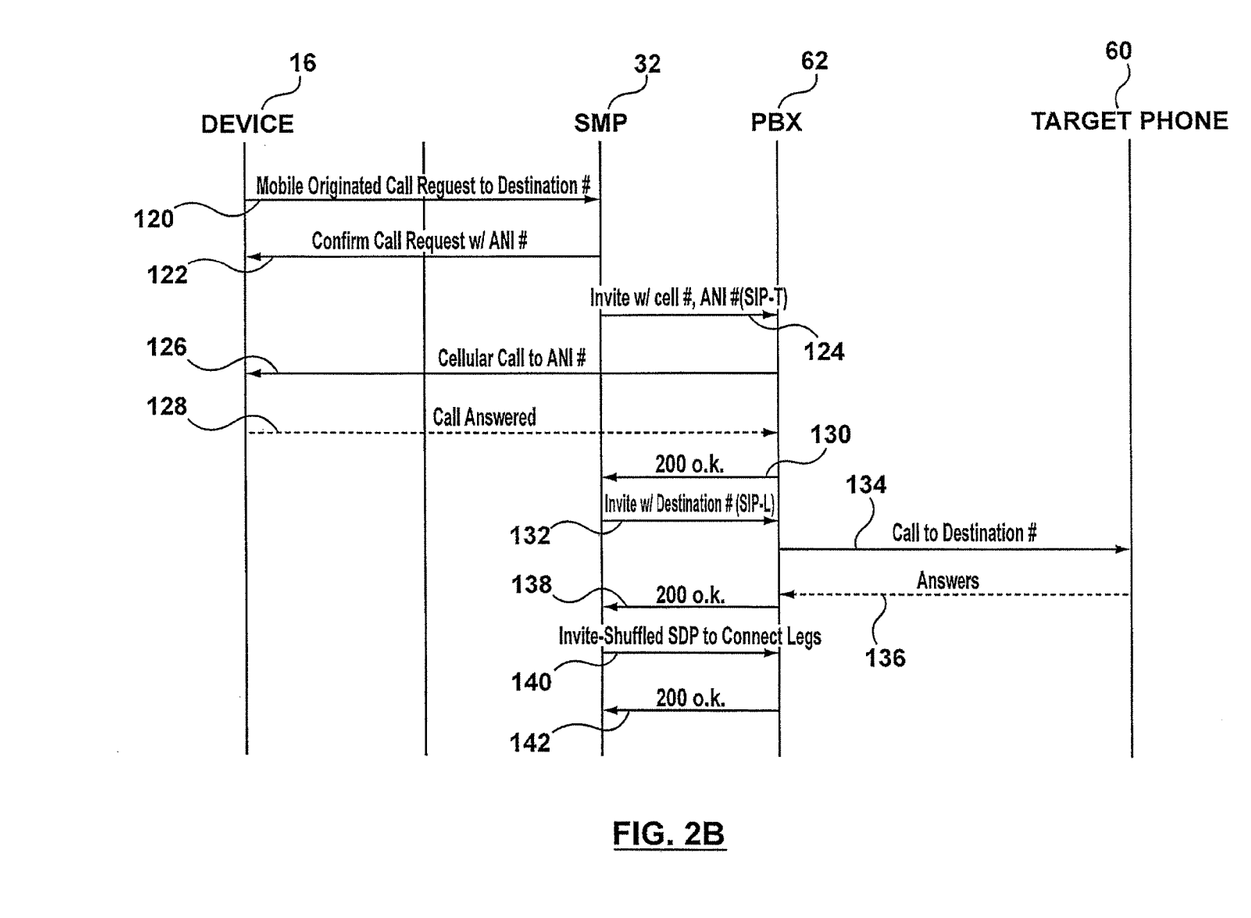
FIG. 2B is a signaling diagram generally indicating how mobile-originated, PBX-initiated, calls are processed by the network of FIG. 1.

The above description is known as a "mobile initiated" call, because the SMP 32 provides the mobile device 16 with the DNIS number into which the mobile device 16 has called. Alternatively, the mobile originated call could be "PBX initiated", as shown in FIG. 2B. Specifically, in a PBX-initiated call, upon receipt of the mobile originated call request (block 120), the SMP 32 confirms receipt of the call to the mobile device 16 with an ANI number (block 122), which the mobile device uses to identify the incoming call from the PBX 62. The PBX 62 then sends an invite to the PBX 62 with the cellular number of the device and the ANI number that is attached to the outgoing call (block 124). Upon receipt of the invite, the PBX 62 makes a cellular call to the device 16 (block 126), which is answered by the device (block 128). The device 16 checks the ANI number in the incoming call to confirm if the number is actually from the PBX 62. If the ANI number is stripped for any particular reason, then the device 16 may be configured to answer the call as a regular cellular call, or it may reject the call as unknown. When the device 16 answers the PBX-initiated call, the PBX 62 sends a 200 o.k. signal to the SMP 32, indicating that the call leg to the device is established (block 130).

In response, the SMP 32 sends an invite with the destination number of the target phone 60 to the PBX 62 (block 132). When the invite is received at the PBX 62, the PBX dials the destination number to the target phone 60 (block 134), the target phone picks up the call (block 136), and a 200 o.k. signal is sent from the PBX to the SMP 32 (block 138), indicating that the target phone is also ready to receive data. In response to the 200 o.k., the SMP 32 sends an invite to the PBX 62, shuffling the SDP to connect the call legs (block 140). Finally, when the call legs are connected, the PBX 62 sends a second 200 o.k. signal to the SMP 32, and the users of the device 16 and target phone 60 are able to communicate with each other.

In both instances, the SMP 32 is performing third party call control of the two call legs, the PBX 62 remaining in control of the call. The decision of whether to proceed with a mobile-initiated call or a PBX-initiated call can be set by policy. Specifically, the option to select either mobile-initiated or PBX-initiated calls is a feature provided in the SMP 32, and an administrator for the enterprise 12 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 3A:
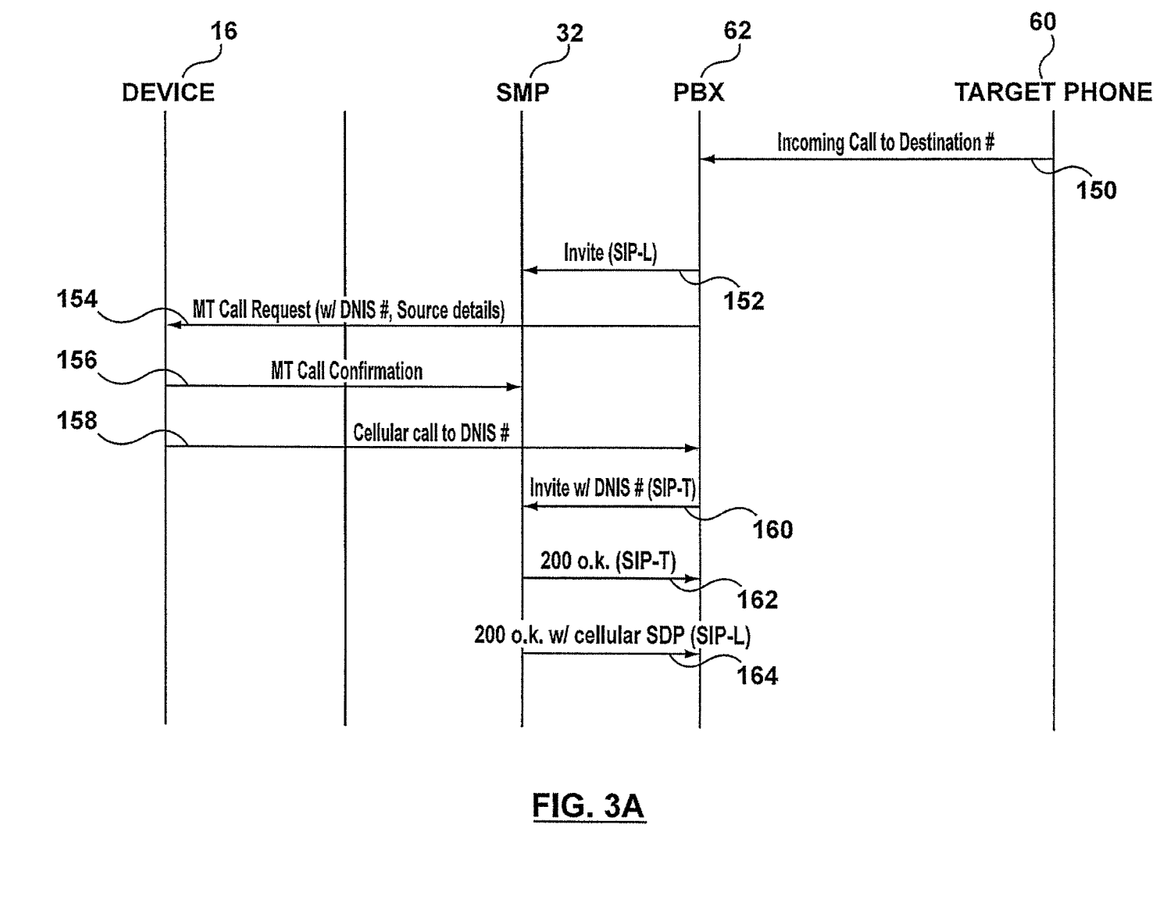
FIG. 3A is a signaling diagram generally indicating how mobile-terminated, mobile-initiated calls are processed by the network of FIG. 1.
Figure 3B:
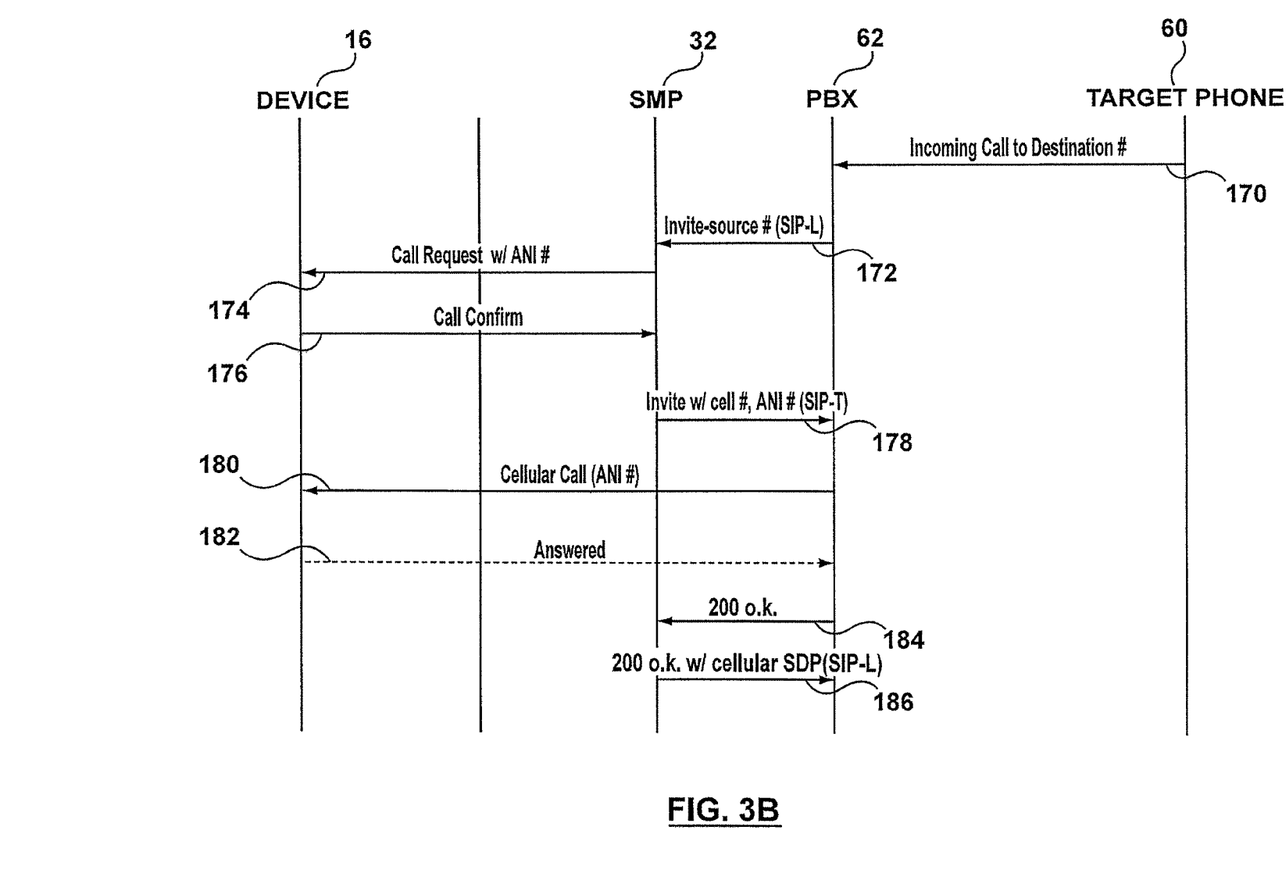
FIG. 3B is a signaling diagram generally indicating how mobile-terminated, PBX-initiated calls are processed by the network of FIG. 1.

FIGS. 3A and 3B are signaling diagrams illustrating a mobile terminated call utilizing SIP 40. Specifically, and for the purposes of this disclosure, the target phone 60 is originating the call, which will send a call to the mobile device. Turning first to FIG. 3A, an incoming call is made from the target phone 60 to the PBX 62 (block 150). When the call is received at the PBX 62, the PBX sends an invite to the SMP 32 (block 152).

In response to the invite, the SMP 32 sends a call request with the DNIS number and source details to the device 16 (block 154), which is confirmed to the SMP (block 156). In addition to confirming the call, the mobile device 16 sends a cellular call to the DNIS number at the PBX 62 (block 158). Again, as the DNIS number is routed in the dialing plans to the SMP 32, upon receipt of the cellular call, the PBX 62 sends an invite to the SMP 32 with the DNIS number (block 160). In response to the invite, a "200 o.k." signal is sent from the SMP 32 to the PBX 62, acknowledging that the call leg to the mobile device 16 is established (block 162). Finally, the initial invite (block 152) is acknowledged with the "200 o.k." signal with the cellular SDP, at which point the call legs are joined and the target phone 60 and device 16 can communicate with each other on the call.

The diagram shown in FIG. 3A illustrates a "mobile-initiated" call, because, as discussed above with respect to FIGS. 2A and 2B, the SMP 32 presents the mobile device 16 with the DNIS number at the PBX 62 into which to call. However, it is also possible to employ a "PBX-initiated" mobile terminated call, as shown in FIG. 3B, where the PBX 62 sends an incoming call to the device 16 with the ANI number of the target phone 60.

Specifically, similar to the mobile initiated call described above and shown in FIG. 3A, the target phone 60 sends an incoming call to the destination number of the device, which is received at the PBX 62 (block 170). Upon receipt of the call, the PBX 62 sends an invite to the SMP 32 (block 172) with the source number of the target phone 60. In response to the invite, the SMP 32 sends a call request with the source number to the device 16 (block 174), with the ANI number the device should expect in the incoming call, the call request being confirmed by the device (block 176). At this point in the PBX-initiated call, the SMP 32 sends an invite to the PBX with the cellular number and ANI number to use (block 178), prompting the PBX 62 to make a cellular call to the device 16 with the ANI number (block 180), prompting the device to ring. The device answers the call (block 182), and a "200 o.k." signal is sent from the PBX 62 to the SMP 32, acknowledging that the cellular call leg to the device 16 is established (block 184). In response, a "200 o.k." signal is also sent from the SMP 32 to the PBX 62, acknowledging that the call leg to the target phone 60 is also established (block 186). The SMP 32 shuffles the SDP to connect the call legs, the call legs are joined, and the target phone 60 and device 16 can communicate with each other on the call.

As discussed above with respect to FIGS. 2A and 2B, the SMP 32 remains in control of the signaling between the target phone 60 and the mobile device 16 in both the mobile-initiated and PBX-initiated calls. Again, the decision to proceed with a mobile-initiated call or a PBX-initiated call is based on policy and made by the administration of the organization. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Attention will now be turned to the operation of a conference services application 64, which enables multiple communication devices (including desk telephones and personal computers) to participate in a conference call through use of a centralized conference server 66. As seen in FIG. 1, the conference server 66 is provided in the enterprise 12 and is in communication with the conference services application 64 preferably through the SIP protocol 40 (either utilizing SIP-L or SIP-T as described above), although it is recognized that additional protocols that control media separate from data may be appropriate, such as the Web Services protocol 42 or the CTI protocol 46. As will be described in further detail below, the conference call server 66 is configured for directing media and data streams to and from one or more communication devices (i.e., mobile devices 16, telephones 28, and computers 30).

Figure 4A:
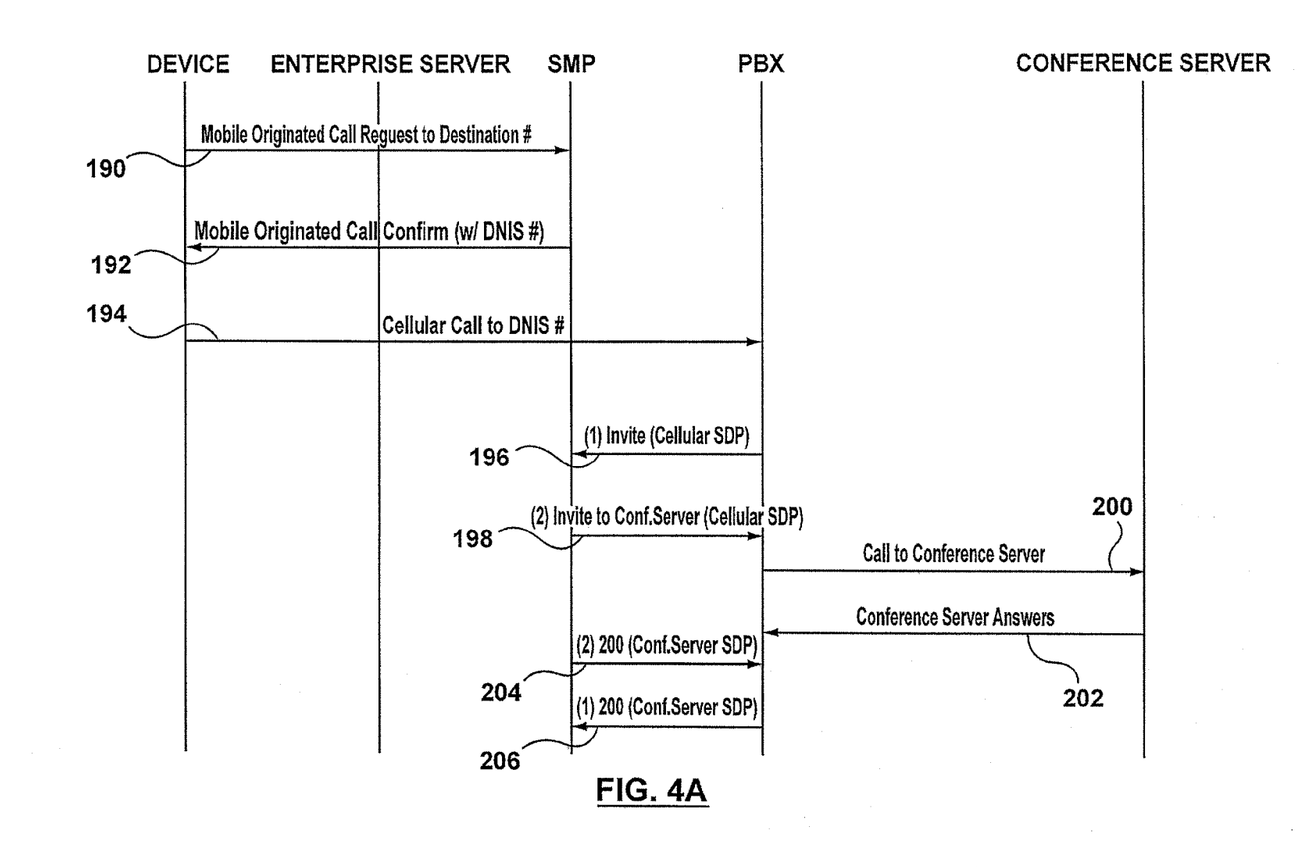
FIG. 4A is a signaling diagram generally indicating how mobile-originated, mobile-initiated conference calls are processed by the network of FIG. 1.

Turning now to FIGS. 4A-5B, the basic initiation of a conference call utilizing the SIP protocol 40 is provided. In FIG. 4A, the mobile device 16 joins the conference call at the appropriate time by calling a specified dial-in number and entering an access code, as known in the art. However, it is understood that other methods for joining a conference call are appropriate, and the present application is not limited to those options discussed herein. For example, the user of the mobile device 16 could access their calendar, select the scheduled conference call, and the device could automatically dial the appropriate number, without the need for an access code. Similarly, the user could receive an alert that the conference call is approaching, select an option to dial the appropriate number, and be joined to the conference call. Optionally, the user could access their email, find the conference call invite, and select the appropriate dial-in number for joining the conference call. For purposes of this disclosure and as known in the art, the terms cellular SDP and conference server SDP (used below) refer to communication ports provided on the PBX 62 and the conference server 66, respectively, through which signals are sent during the conference call.

Specifically and as shown in FIG. 4A, at the designated time of the conference call, the mobile device 16 sends a call request with the destination number to the SMP 32 (block 190), which the SMP confirms to the mobile device with the DNIS number (block 192). Upon receipt of the confirmation, the mobile device 16 sends a cellular call to the DNIS number, which is received at the PBX 62 (block 194). The PBX 62 then establishes a first dialog and sends an invite containing the cellular SDP (block 196) to the SMP 32, which in response, establishes a second dialog by sending an invite to the PBX also containing the cellular SDP (block 198). At this point, the PBX 62 calls the conference server 66 (block 200), and the conference server answers the call (block 202). When the PBX 62 is notified that the conference server 66 has answered the call, the PBX utilizes the second dialog and sends a "200 o.k" containing the conference server SDP to the SMP 32 (block 204). In response, the SMP 32 utilizes the first dialog and sends a "200 o.k." to the PBX 62 containing conference server SDP (block 206). By this method the PBX has now the SDP of the conference server to which it sends media received from the cellular device and the conference server has the SDP on the PBX to which it can send media which is in turn sent onto the cellular device. The call legs are now connected. Once connected to the conference server 66, the user enters the access code into the mobile device (if applicable), enabling participation in the conference call.

Figure 4B:
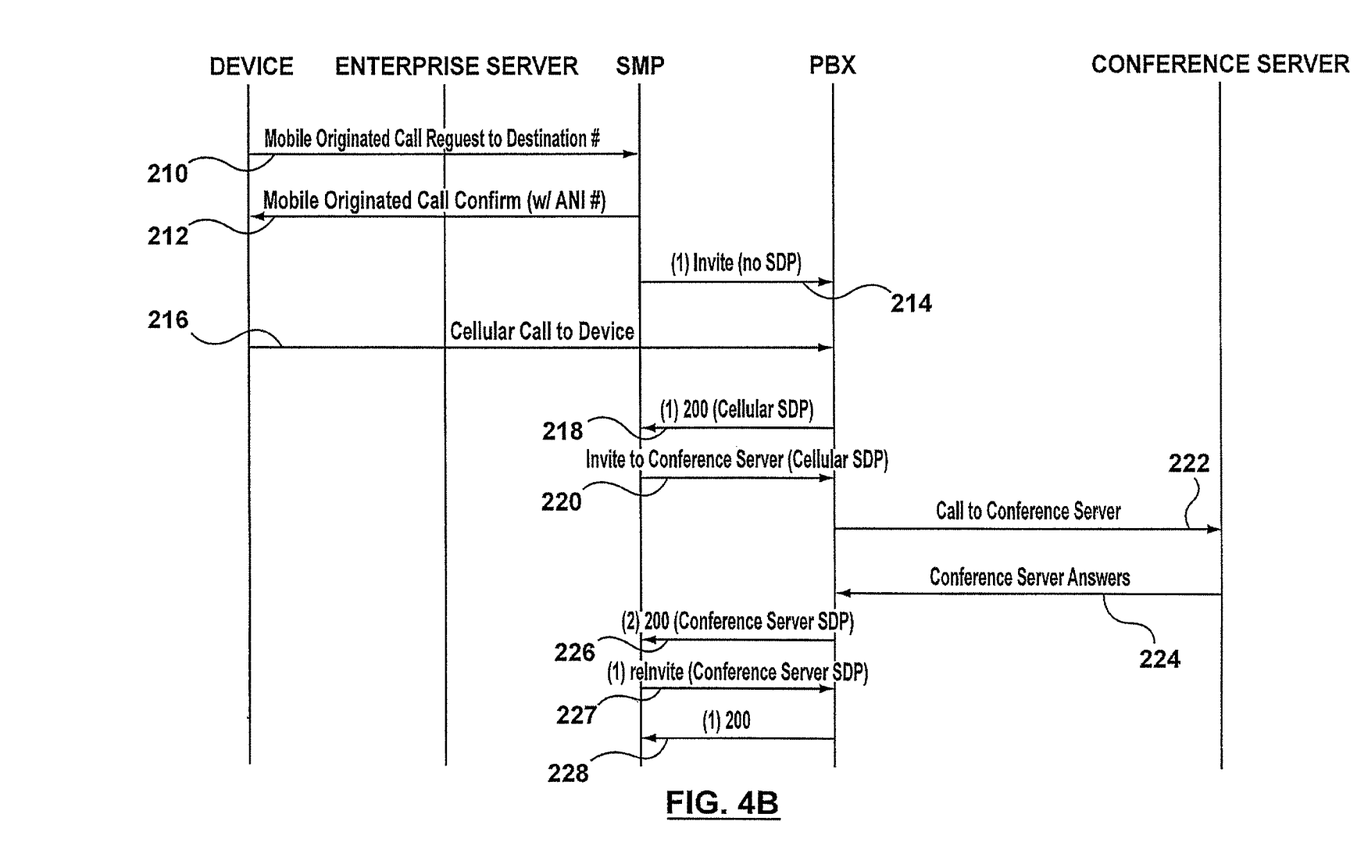
FIG. 4B is a signaling diagram generally indicating how mobile-originated, PBX-initiated conference calls are processed by the network of FIG. 1.

Similar to the mobile originated call described with respect to FIG. 2A, the mobile originated call in FIG. 4A is mobile-initiated, because the SMP 32 provides the mobile device 16 with a DNIS number at the PBX 32 into which to call. Alternatively, the mobile originated call to the conference server 66 can also be PBX-initiated, which is shown in FIG. 4B. Specifically, the mobile device 16 sends a call request to the destination number of the conference server 66, which is received at the SMP 32 (block 210). Upon receipt of the call request, the SMP 32 confirms the call request to the device 16 containing the expected ANI number of the call back (block 212). At this point, the SMP 32 establishes a first dialog and sends an invite to the PBX 62 (block 214), instructing the PBX 62 to send a cellular call to the device (block 216). Utilizing the first dialog, the PBX 62 then sends a "200 o.k." signal containing the cellular SDP to the SMP 32 (block 218), and the SMP establishes a second dialog and sends an invite to the PBX containing the cellular SDP (block 220). In response to the invite, the PBX 62 calls the conference server 66 (block 222), and the conference server answers the call (block 224). When the PBX 62 is notified that the conference server 66 has answered the call, the PBX, utilizing the second dialog, sends a "200 o.k." signal containing conference server SDP to the SMP 32 (block 226). At this point, the SMP 32 utilizes the first dialog and re-invites the PBX 62 containing conference server SDP (block 227). In response, the PBX 62, utilizing the first dialog, sends a "200 o.k." signal to the SMP 32 (block 228), connecting the call legs and enabling the device to participate in the conference call. By this method the PBX has now the SDP of the conference server to which it sends media received from the cellular device and the conference server has the SDP on the PBX to which it can send media which is in turn sent onto the cellular device.

Figure 5A:
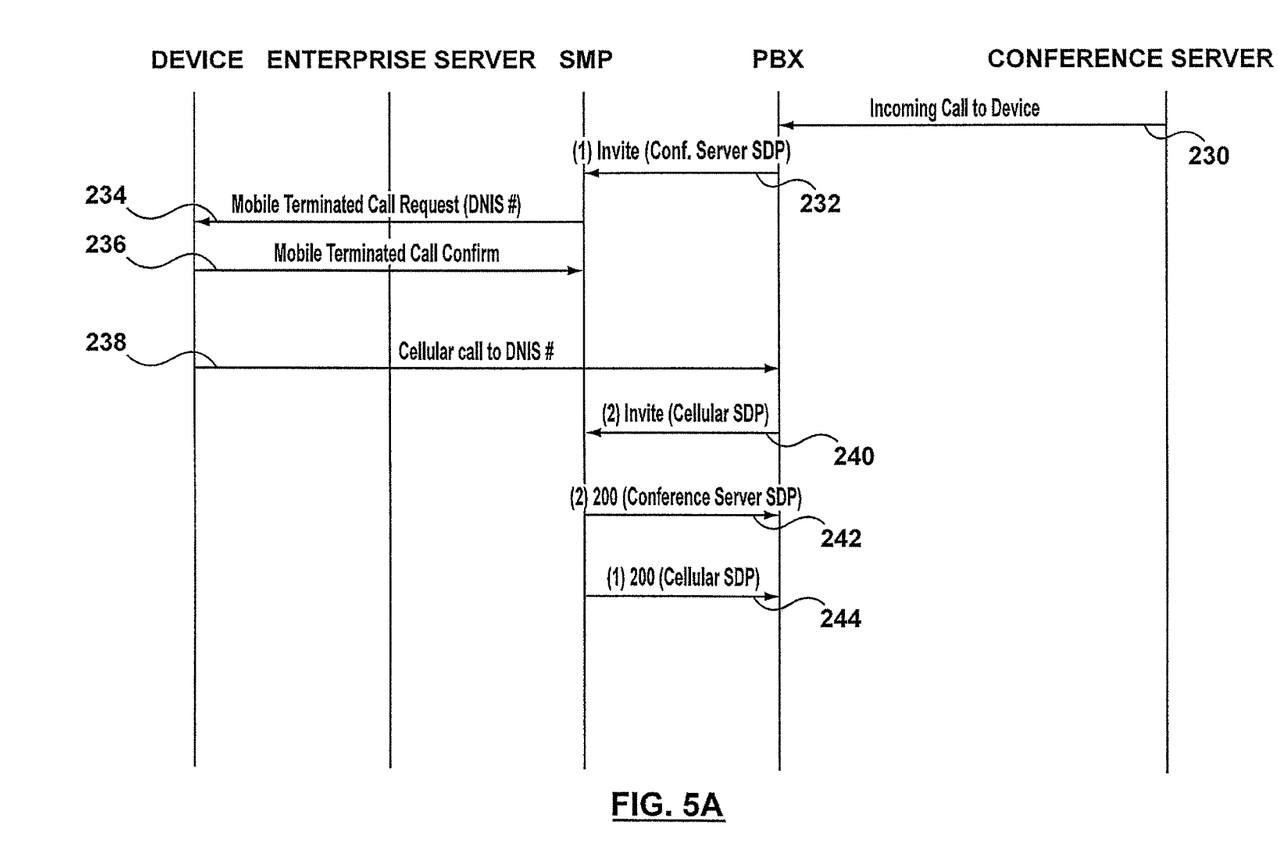
FIG. 5A is a signaling diagram generally indicating how a mobile-terminated, mobile initiated is used as part of a scheduled "fetch me" conference call processed by the network of FIG. 1.
Figure 5B:
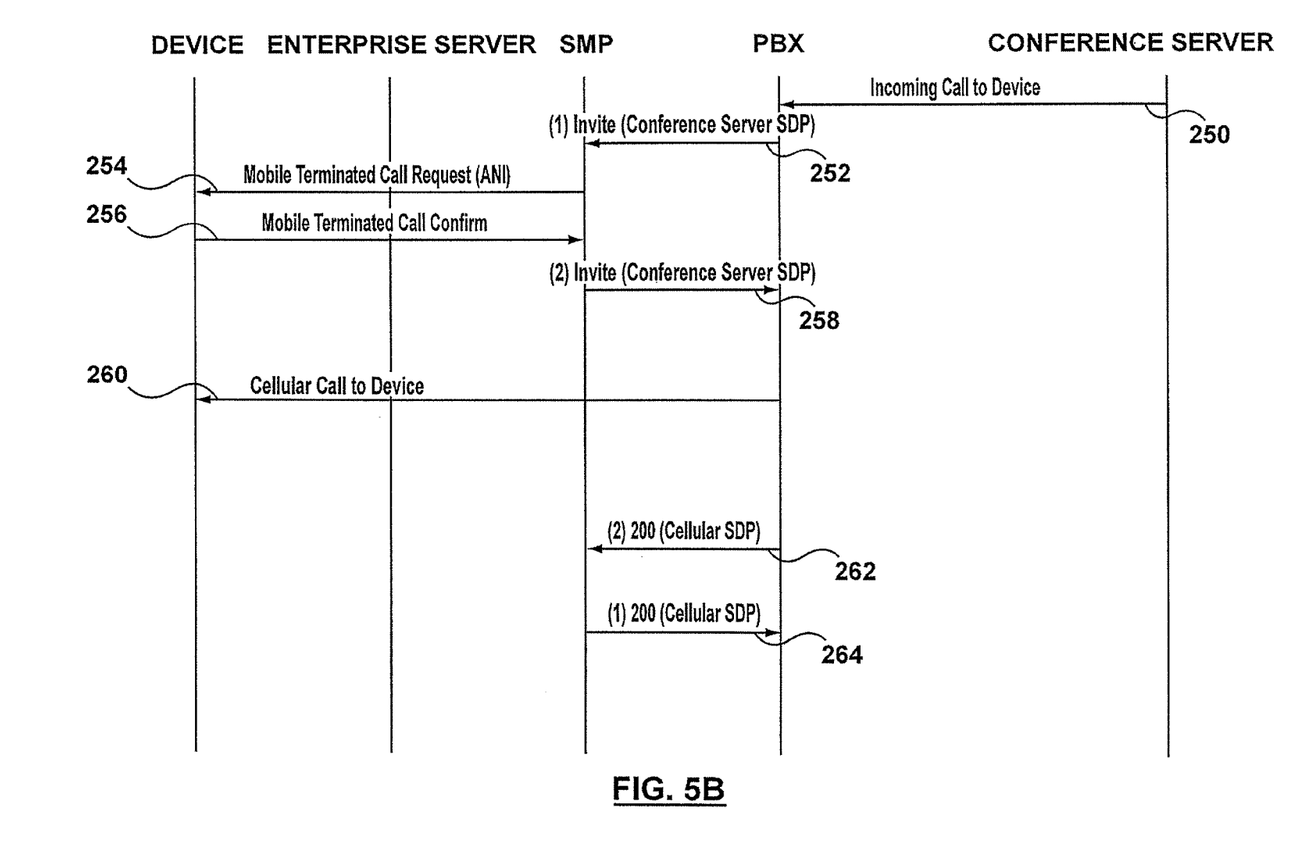
FIG. 5B is a signaling diagram generally indicating how a mobile-terminated, PBX-initiated call is used as part of a scheduled "fetch me" conference call processed by the network of FIG. 1.

Turning now to FIGS. 5A and 5B, it is also possible for the conference server 66 to "fetch" or bring the mobile device 16 into the conference call at the appropriate time. It is contemplated that this can happen in a variety of ways, and the present disclosure is not limited to those methods described herein. For example, the mobile device could have previously accepted an invitation to the conference call, of which the conference call server 66 makes note, calling the device at the appropriate time, as known in the art. Alternatively, the user of the mobile device 16 could, upon acceptance of the invitation, elect to be dialed into the conference call at the appropriate time, as also is known in the art. Such a "fetch" option may be beneficial to users who are unable to dial into the conference call at the desired time (i.e., they are driving), but still want to be included in the conference.

Specifically, and as seen in FIG. 5A, the conference server 66 sends an incoming call signal to the device, which is received at the PBX 62 (block 230), which then establishes a first dialog and sends an invite containing conference server SDP to the SMP 32 (block 232). Upon receipt of the invite, the SMP 32 sends a mobile terminated call request with the DNIS number to the mobile device 16 (block 234), which call is confirmed by the mobile device (block 236). The device 16 then makes a cellular call to the DNIS number, which is received at the PBX 62 (block 238). When the call is received, the PBX 62 establishes a second dialog and sends an invite containing cellular SDP to the SMP 32 (block 240). In response to the invite, the SMP 32, utilizing the second dialog, sends a "200 o.k." signal containing conference server SDP to the PBX 62 (block 242). At this point, the SMP 32, utilizing the first dialog, also sends a "200 o.k." signal containing cellular SDP to the PBX 62 (block 244), enabling the conference server 66 and device 16 to communicate with each other on the call. By this method the PBX has now the SDP of the conference server to which it sends media received from the cellular device and the conference server has the SDP on the PBX to which it can send media which is in turn sent onto the cellular device.

FIG. 5A indicates a mobile-initiated call, because the device 16 calls into a DNIS number. Alternatively and as shown in FIG. 5B, the conference server originated call can also be PBX-initiated, where the SMP 32 causes the PBX 62 to call out to the device 16 with a known ANI number. Specifically, the conference server 66 sends an incoming call to the device 16, which is received at the PBX 62 (block 250), which then establishes a first dialog and sends an invite containing conference server SDP to the SMP 32 (block 252). The SMP 32 sends a mobile terminated call request to the device 16, providing the ANI number that the call will contain (block 254), the receipt of which the mobile device confirms (block 256). The SMP 32 then establishes a second dialog and sends an invite containing conference server SDP to the PBX 62 (block 258). In response to the invite, the PBX 62 sends a cellular call to the device 16 (block 260). When the call is received at the device 16, the PBX 62, utilizing the second dialog, sends a "200 o.k." signal containing cellular SDP to the SMP 32, and the SMP 32, utilizing the first dialog, sends a "200 o.k." signal containing cellular SDP to the PBX 62, at which point the device 16 is connected into the conference call. By this method the PBX has now the SDP of the conference server to which it sends media received from the cellular device and the conference server has the SDP on the PBX to which it can send media which is in turn sent onto the cellular device.

As mentioned above with respect to FIGS. 2A-3B, the decision to proceed with a mobile-initiated call versus a PBX-initiated call is a policy decision that is made by the administrator or someone within the organization. Further, although FIGS. 4A-5B discuss a mobile device 16 joining a conference call, it is appreciated that other communication devices may also be joined into the conference call, such as telephones 28 on the PSTN 24, computers 30, and the like. These communication devices would be joined to the conference call server 66 in the same manner as that described above with respect to the mobile device 16, and accordingly will not be described in further detail herein.

Figure 6:
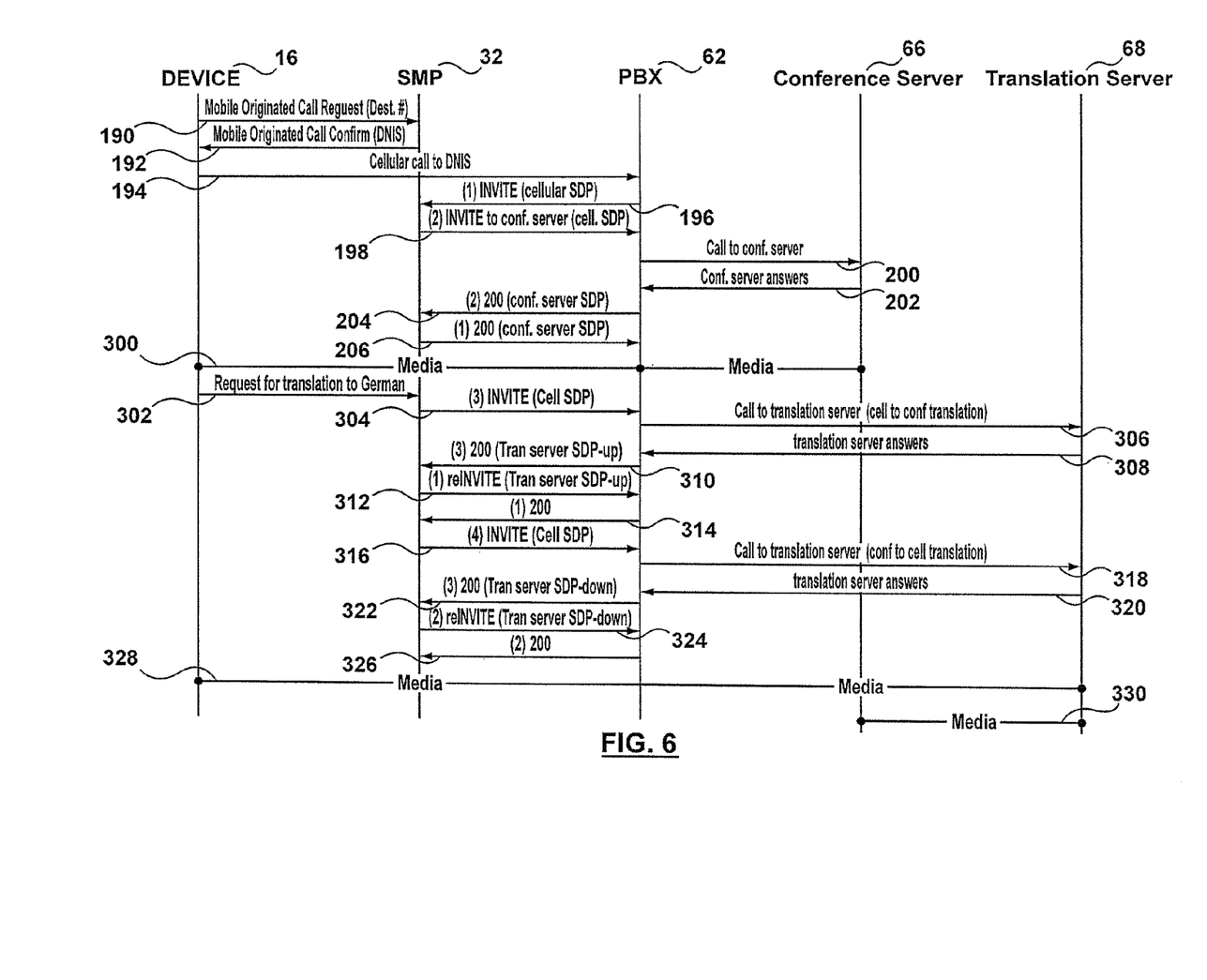
FIG. 6 is a signaling diagram generally indicating how a conference call having multiple language participants is processed by the network of FIG. 1.
Figure 7A:
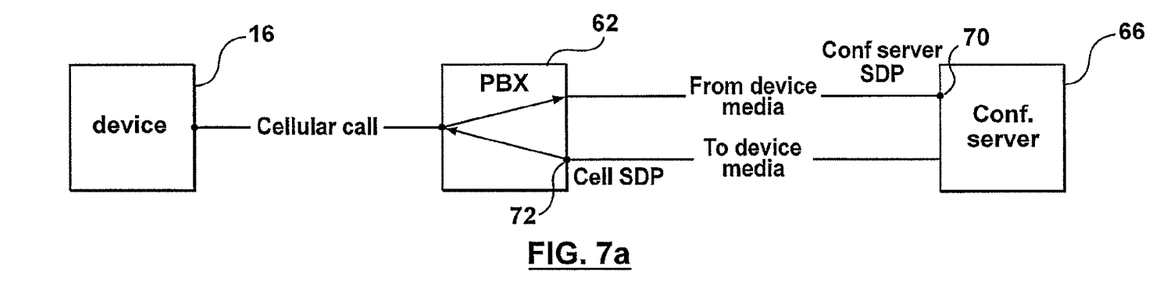
FIG. 7a is a diagram generally indicating how media streams are directed during a single language conference call.
Figure 7B:
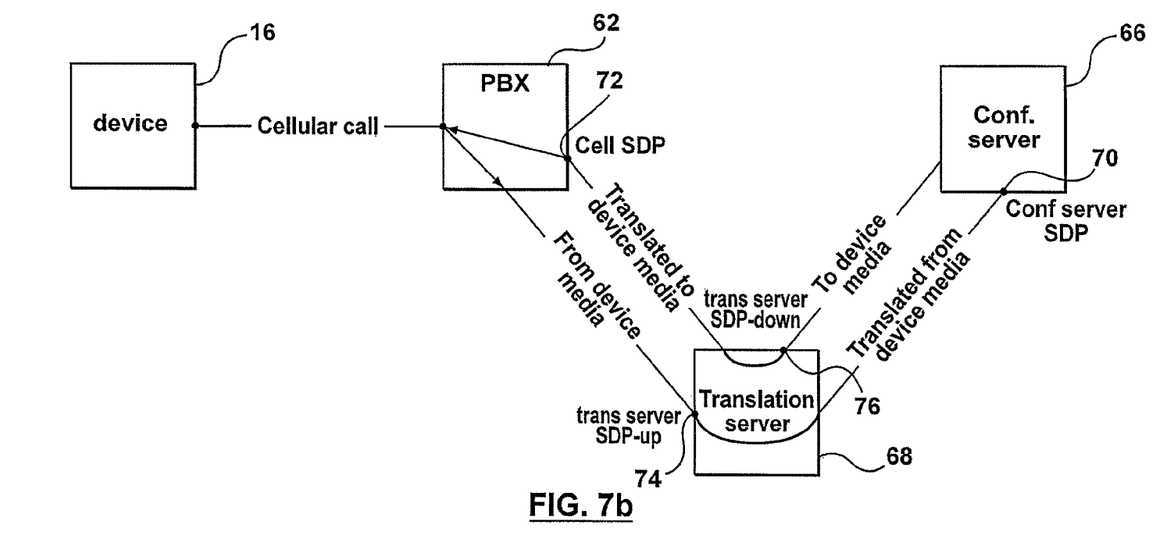
FIG. 7b is a diagram generally indicating how media streams are directed during a multiple language conference call including a translation server.

Referring now to FIGS. 6 and 7, to enable translation of the media streams, a translation server 68 is provided and configured for receiving the media streams, translating the media streams into a desired language and transmitting the media streams to the communication device 16, as will be described in further detail below. It is contemplated that the translation server 68 can be provided as a separate component within the enterprise 12 (not shown), or as a component within the conference server 66 (FIG. 1). The translation server 68 will enable those participants who do not speak the same language as other participants to still partake in the conference call. For example, and as will be described in further detail below, if the conference call is occurring primarily in English, but one of the participants speaks German, they will have the option to send and receive media streams in German. However, the remaining participants will continue to receive and send media streams in English.

Specifically, and as seen in FIG. 6, a signaling diagram for a method of directing media streams during a conference call is provided. It will be appreciated that the method described herein is not limited to the steps disclosed or the order in which they are disclosed. FIG. 6 shows a mobile-originated, mobile-initiated conference call, as shown and described above with respect to FIG. 4a, although it is to be appreciated that the method for directing media applies similarly to mobile-originated, PBX-initiated (as shown in FIG. 4b) calls; mobile-terminated, mobile-initiated (as shown in FIG. 5a) calls; and mobile-terminated, PBX-initiated (as shown in FIG. 5b) calls. Accordingly, blocks 190-206 (described in detail above with respect to FIG. 4a) will not be described again herein.

Upon commencement of the conference call at block 206, media streams are directed between the device 16 and the conference server 66 (block 300). Specifically, media originating at the device 16 is directed from the device, through the PBX 62 and to the conference server 66 via conference server SDP (i.e., through a conference server communication port 70 provided in the conference server 66). In response, media originating from the conference server 66 is directed from the conference server, through the PBX 62 and to the device 16 via cellular SDP (i.e., through a PBX communication port 72 provided in the PBX). If there are no translation issues, the conference call continues, with media being directed between the device 16 and the conference server 66 as described above (and as shown in FIG. 7a).

However, if a need for translation arises, a request is sent from the device 16 to the SMP 32 for translation to German, for example (block 302). In response, the SMP 32 establishes a third dialog and sends an invite containing cellular SDP to the PBX 62 (block 304), which then sends a call to the translation server 68 for cellular-to-conference translation (block 306). When the translation server 68 answers the call (block 308), the PBX 62 is notified and utilizes the third dialog to send a "200 o.k." signal containing translation server SDP-up (i.e., via an upflow translation server communication port 74, as seen in FIG. 7b) to the SMP 32 (block 310). In response, the SMP 32 utilizes the first dialog and sends a re-invite containing translation server SDP-up to the PBX 62 (block 312).

Once the invite is received, the PBX utilizes the first dialog and sends a "200 o.k." signal to the SMP 32 (block 314). Upon receipt of the "200" signal, the SMP 32 establishes a fourth dialog and sends an invite containing cellular SDP to the PBX 62 (block 316). When the PBX 62 receives the invite, it calls the translation server 68 for conference-to-cellular translation (block 318), and the translation server answers the call (block 320). When the PBX 62 is notified that the translation server 68 has answered the call, it utilizes the third dialog and sends a "200 o.k." signal containing translation server SDP-down (i.e., via a downflow translation server communication port 76, shown in FIG. 7b) to the SMP 32 (block 322). In response, the SMP, utilizing the second dialog, sends a re-invite containing translation server SDP-down to the PBX 62 (block 324). Upon receipt of the re-invite, the PBX 62 utilizes the second dialog and sends a "200 o.k." signal to the SMP 32 (block 326). At this point, media is sent between the device 16 and the translation server 68 (block 328), and also between the translation server and the conference server 66 in the desired language (block 330). By this method the PBX has been given the communication port on the translation server to which it sends media received from the device and the translation server has been given the communication port on the conference server to which it sends the subsequently translated media. In the reverse direction, the conference server has been given the communication port on the translation server to which it sends media destined for the device, and the translation server has the communication port on the PBX to which it sends the subsequently translated media to be sent onto the device.

FIG. 7b more clearly shows the path the media streams take during translation, and is generally designated 400. As shown, the present method enables media to be translated both to and from the device. For example, when the conference server 66 requests translation of media arising from the device 16, the media is sent from the device, through the PBX 62 and to the translation server 68 through the upflow translation server communication port 74. Once the media is received at the translation server 68, it is translated to the desired language and sent to the conference server 66 via the conference server communication port 70 (i.e., via conference server SDP). Similarly, if the device requests a translation of the media, the conference server 66 sends the media to the translation server 68 via the downflow translation server communication port 76. Once the media is received, it is translated into the desired language and sent to the PBX 62 via the PBX communication port 72 (i.e., via cellular SDP) and finally on to the device 16.

It is contemplated that a conference call participant can opt to have the media translated into their desired language at any point during the conference call. Specifically, in one instance, the conference call invitee will receive an invite to participate in a conference call at their communication device 16, and upon acceptance of the invite, select the language in which they wish to participate in the conference call. Alternatively, upon connection of the device to the conference call, the participant can select a language from a menu on the communication device 16 in which the conference call will be conducted. For example, a drop-down menu will appear with a list of languages supported by the translation server 68. It is contemplated that the translation server 68 can support a plurality of languages, such as English, French, German, Italian, Japanese, Chinese and Spanish. It will be appreciated that the translation server 68 is not limited to the languages discussed herein. If the participant does not wish to select a translation language at that time, it is contemplated that they can access the language menu at any time during the conference call.

It is also contemplated that several devices can participate in the conference call, and that each of these devices can request to have the media streams translated into a particular language). As known in the art, each device 16 has a unique network identifier (i.e., a phone number, IP address, SIP URI), and accordingly the streams are kept separate and can be independently translated to the proper language.

It is appreciated that the media streams can be directed to the devices 16 over either packet-switched or circuit-switched voice, as known in the art. For example, if the media stream is directed to the device over packet-switched voice, it will be transmitted to the appropriate address and port number (i.e., either audio or data) in the device, as described in the above method. If the media stream is sent to the device over circuit-switched voice, it will be transmitted over GSM channel (if audio) or over the GPRS data channel (if text), for example.

For conference call participants who are unable to receive voice streams of the conference call (i.e., they are in another meeting or in a location where they can not speak freely), the enterprise 12 further includes a voice to data server (not shown) configured for converting the voice stream to a data stream, where the data stream is transmitted to one of the communication devices 16. Specifically, upon connecting the device to the conference call, as described above with reference to FIGS. 4A-5B (block 402), a menu will appear on the participant's device indicating that the conference call can be transmitted as either a voice or data stream. The participant can then select the text message option from the menu. It is contemplated that the participant can opt to receive the media stream in text or voice form at any point during the conference call. For example, if the participant is originally receiving voice streams of the call and needs to go to a meeting, he can access the menu and opt to receive text of the conference call from that point forward.

When a voice-to-data server is utilized, media streams are directed in the same manner as when the translation server 68 is utilized, except that rather than coming through the PBX 62, data would travel through a specified server, such as an IM server, for example. It is contemplated that the media can be translated from voice to text or vice versa. Specifically, when the device requests data be sent as a text message, media is sent from the conference server 66 to the voice-to-data server, where it would be translated into text. The translated text would then be sent to the device via the IM server. Alternatively, if the device 16 is sending responses as text messages which need to be translated to voice streams, the media is sent from the device, through the IM server to the voice-to-data server, where it is translated into a voice stream. The voice stream is then sent to the conference server 66, where it can be transmitted to the other devices on the call as a voice stream. It is to be understood that the present system is not limited to the above-described method.

The present system 10 with conference call capability provides an efficient and practical method for receiving and directing media streams during a conference call. By providing a platform capable of remotely controlling a centralized conference server within the enterprise, the media streams are directed to a single server where they are translated and sent to the participating devices in a desired language, alleviating the need for each participant to communicate with its own conference and translation service. The present system also allows participants to participate in the conference call via either audio or text streams, and enables the participant to select these options anytime during the call. Further, the present system does not require the device to be updated with any additional software to communicate with the conference server and platform, enabling efficient and cost effective communication.

While a particular embodiment of the present method and system for directing media streams during a conference call has been described herein, it will be appreciated by those skilled in the art that changes and modifications may be made thereto without departing from the disclosure in its broadest aspects and as set forth in the following claims.

The invention claimed is:

1. A method of providing translations in a system during a conference call, the system including a conference call server, a communication device, a translation server, a session management platform for establishing and directing media streams, and a private branch exchange (PBX), the conference call having a call language, the method comprising:
   receiving, at the session management platform, a language selection from the communication device, wherein the selected language differs from the call language;
   routing media from the device to the conference server through the translation server;
   routing media from the conference server to the device through the translation server; and,
   at the translation server, translating media from the device into the call language before transmitting it to the conference server, and translating media from the conference server into the selected language before transmitting it to the device; and
   wherein routing media from the device to the conference server through the translation server comprises directing the PBX to send media intended for the conference call server to the translation server,
      wherein directing the PBX to send media to the translation server comprises sending a RE-INVITE message from the session management platform to the PBX including session description protocol address information for an upflow translation server port within a first dialog established for the conference call.

2. The method claimed in claim 1, wherein the conference call server and translation server are implemented on the same server.

3. The method claimed in claim 1, wherein the session management platform, conference call server, and translation server are interconnected by an enterprise network.

4. The method claimed in claim 3, wherein routing media from the device to the conference server comprises routing media from the device to the PBX, from the PBX to the translation server, and from the translation server to the conference server, and wherein routing media from the conference server to the device comprises routing media from the conference server to the translation server, from the translation server to the PBX, and from the PBX to the device.

5. The method claimed in claim 4, wherein the communication device comprises a mobile handheld device.

6. The method claimed in claim 4, further including establishing a media link between the communication device and the PBX, and establishing a media link between the PBX and the conference call server, and wherein routing media from the device to the conference server through the translation server further comprises rerouting the media links by directing the translation server to send media received from the PBX to the conference call server, directing the conference call server to send media intended for the PBX to the translation server, and directing the translation server to send media received from the conference call server to the PBX.

7. The method claimed in claim 6, wherein directing the conference call server to send media to the translation server comprises sending a RE-INVITE message from the session management platform to the PBX passing including the session description protocol address information for a downflow translation server port within a second dialog established for the media link.

8. The method claimed in claim 1, wherein the communication device includes a user interface and is configured to display a language menu listing languages supported by the translation server, and wherein the method further includes a step of receiving user selection of the selected language from the language menu, and transmitting the selected language to the session management platform.

9. The method claimed in claim 1, wherein the translation server comprises a voice-to-data translator, and wherein the selected language comprises text, and wherein translating media from the conference server into the selected language comprises translating the media into text and transmitting text to the device.

10. A system for managing a conference call including a communication device, the conference call having a call language, the system comprising:
    a private branch exchange (PBX);
    a conference call server for managing media for the conference call;
    a session management platform configured to receive a language selection from the communication device, wherein the selected language differs from the call language; and
    a translation server,
    wherein the session management platform is configured to send instructions in response to the received language selection to cause media to be routed from the device to the conference server through the translation server and to cause media to be routed from the conference server to the device through the translation server,
    wherein the PBX is configured to redirect media intended for the conference call server to the translation server in response to the instructions,
    wherein the translation server is configured to translate media from the device into the call language before transmitting it to the conference server, and to translate media from the conference server into the selected language before transmitting it to the device, and
    wherein the instructions include a RE-INVITE message from the session management platform to the PBX including session description protocol address information for an upflow translation server port within a first dialog established for the conference call.

11. The system claimed in claim 10, wherein the conference call server and translation server are implemented on the same server.

12. The system claimed in claim 10, further including an enterprise network interconnecting the session management platform, the conference call server, and the translation server.

13. The system claimed in claim 12, wherein the instructions cause media from the device to the conference server to be routed from the device to the PBX, from the PBX to the translation server, and from the translation server to the conference server, and wherein the instructions cause media from the conference server to the device to be routed from the conference server to the translation server, from the translation server to the PBX, and from the PBX to the device.

14. The system claimed in claim 13, wherein the communication device comprises a mobile handheld device.

15. The system claimed in claim 13, wherein the translation server is configured to send media received from the PBX to the conference call server in response to the instructions, the conference call server is configured to redirect media intended for the PBX to the translation server in response to the instructions, and the translation server is configured to send media received from the conference call server to the PBX.

16. The system claimed in claim 15, wherein the instructions further include a RE-INVITE message from the session management platform to the PBX including the session description protocol address information for a downflow translation server port within a second dialog established for the conference call.

17. The system claimed in claim 10, further including the communication device, wherein the communication device includes a user interface and is configured to display a language menu listing languages supported by the translation server, and wherein the communication device is configured to receive the language selection through the user interface and to transmit the selected language to the session management platform.

18. The system claimed in claim 10, wherein the translation server comprises a voice-to-data translator, and wherein the selected language comprises text, and wherein the voice-to-date translator is configured to translate the media into text and to transmit text to the device.

\* \* \* \* \*